United States Patent
Duan et al.

(10) Patent No.: US 8,120,936 B2
(45) Date of Patent: Feb. 21, 2012

(54) DC-TO-AC POWER CONVERTING DEVICE

(75) Inventors: Rou-Yong Duan, Guosing Township (TW); Chao-Tsung Chang, Daya Township (TW)

(73) Assignee: Hungkuang University, Shalu, Taichung County (TW)

( * ) Notice: Subject to any disclaimer, the term of this patent is extended or adjusted under 35 U.S.C. 154(b) by 196 days.

(21) Appl. No.: 12/635,431

(22) Filed: Dec. 10, 2009

(65) Prior Publication Data
US 2011/0141785 A1   Jun. 16, 2011

(51) Int. Cl.
*H02M 7/537* (2006.01)
(52) U.S. Cl. ......................................... 363/131
(58) Field of Classification Search .............. 363/16, 363/34, 78, 79, 95, 97, 131–134
See application file for complete search history.

(56) References Cited

U.S. PATENT DOCUMENTS

| | | | | |
|---|---|---|---|---|
| 6,330,170 B1 * | 12/2001 | Wang et al. | | 363/37 |
| 7,193,872 B2 * | 3/2007 | Siri | | 363/95 |
| 7,372,709 B2 * | 5/2008 | Mazumder et al. | | 363/132 |
| 7,502,242 B2 * | 3/2009 | Iida | | 363/95 |
| 2006/0171182 A1 * | 8/2006 | Siri et al. | | 363/131 |

OTHER PUBLICATIONS

Deng et al., A New Control Scheme for High-Frequency Link Inverter Design, Feb. 9-12, 2003,IEEE, APEC Eighteenth Annual vol. 1 512-517.*

* cited by examiner

*Primary Examiner* — Jue Zhang
(74) *Attorney, Agent, or Firm* — Occhiutu Rohlicek & Tsao LLP

(57) ABSTRACT

A power converting device is adapted for converting a DC voltage input from an external power source into an AC voltage output. The power converting device includes: a transformer having first and second windings each having opposite first and second ends; a clamp unit coupled to the external power source, and including a first switch coupled between a reference node and the second end of the first winding, and a series connection of a clamp capacitor and a second switch coupled across the first winding; and an inverting unit coupled to the first end of the second winding, and operable so as to output the AC voltage output based on an induced voltage across the second winding.

5 Claims, 14 Drawing Sheets

DC-TO-AC POWER CONVERTING DEVICE

BACKGROUND OF THE INVENTION

1. Field of the Invention

The invention relates to a power converting device, more particularly to a DC-to-AC power converting device.

2. Description of the Related Art

FIG. 1 illustrates a conventional solar power converting system that includes a solar cell array 1 for converting solar energy into electrical energy, a power conditioner 2 for receiving the electrical energy from the solar cell array 1 and for outputting an AC voltage output to a load or a power network, and a rechargeable battery 6. The power conditioner 2 includes a charge/discharge controller 21 coupled to the solar cell array 1 and the rechargeable battery 6, a DC-to-DC converter 22 coupled to the charge/discharge controller 21, and a DC-to-AC inverter 23.

FIG. 2 illustrates a conventional boost device that can be applied to the aforesaid DC-to-DC converter 22 of FIG. 1. The conventional boost device includes an inductor 11, a switch 12, a diode 13, and a capacitor 14. The inductor 11 has a first end coupled to an external power source 10, and a second end. The switch 12, such as a semiconductor power switch, has a first terminal coupled to a common node between the second end of the inductor 11 and an anode of the diode 13, a second terminal coupled to ground, and a control terminal for receiving an external control signal such that the switch 12 is operable between an ON-state and an OFF-state in response to the external control signal. The capacitor 14 is coupled between a cathode of the diode 13 and ground.

When the switch 12 is operated in the ON-state, a current ($i_L$) from the external power source 10 flows through the inductor 11 to store electric power. When the switch 12 is operated in the OFF-state, the capacitor 14 is charged with a current from the inductor 11 through the diode 13 such that the conventional boost device outputs an output voltage, i.e., a voltage across the capacitor 14, to a load.

The following are some of the drawbacks of the conventional boost device:

1. When the switch 12 is in the OFF-state, a voltage across the switch 12 is substantially equal to the output voltage. Therefore, if the switch 12 is implemented as a MOSFET device, a relatively large conducting impedance is exhibited by the MOSFET device, thereby resulting in a relatively large conduction loss.

2. When the switch 12 is switched from the OFF-state to the ON-state, a reverse bias surge current is generated to flow through the switch 12 that causes serious switching loss, thereby reducing power transformation efficiency.

FIG. 3 illustrates another conventional boost device that can be applied to the aforesaid DC-to-DC converter 22 of FIG. 1. The conventional boost device includes a coupling inductor 15, a switch 16, a diode 17, and an output capacitor 18. The coupling inductor 15 has first and second windings 151, 152, each of which has a polarity end and a non-polarity end. The polarity end of the first winding 151 is coupled to an external power source 10. The switch 16 has a first terminal coupled to a common node between the non-polarity end of the first winding 151 and the polarity end of the second winding 152, a second terminal coupled to ground, and a control terminal for receiving an external control signal such that the switch 16 is operable between an ON-state and an OFF-state in response to the external control signal. The diode 17 has an anode coupled to the non-polarity end of the second winding 152, and a cathode. The capacitor 18 is coupled between the cathode of the diode 17 and ground.

When the switch 16 is operated in the ON-state, a current from the external power source 10 flows through the first winding 151 such that the first winding 151 is excited to store electric power. When the switch 16 is operated in the OFF-state, energy stored in the coupling inductor 15 charges the output capacitor 18 through the second winding 152 and the diode 17 such that the conventional boost device outputs an output voltage, i.e., a voltage across the output capacitor 18, to a load.

When the switch 16 is switched from the ON-state to the OFF-state, a voltage is generated as a result of a leakage inductance of the coupling inductor 15 and can cause damage to the switch 16. As such, an additional snubber circuit is required to absorb energy attributed to the leakage inductance.

Since the operation of the conventional boost device is described in detail in the aforesaid patent, further discussion of the same is omitted herein for the sake of brevity.

However, such a conventional boost device cannot provide electrical isolation. Thus, for an outdoor power supplying appliance including the conventional boost device, lightning strike may result in damage to the conventional boost device.

SUMMARY OF THE INVENTION

Therefore, an object of the present invention is to provide a boost device that can attain high power transformation efficiency and that can provide electrical isolation.

According to the present invention, there is provided a power converting device for converting a DC voltage input from an external power source into an AC voltage output. The power converting device comprises:

a transformer having first and second windings each having opposite first and second ends, the first end of the first winding being adapted to be coupled to the external power source;

a clamp unit coupled to the transformer and adapted to be coupled to the external power source, the clamp unit including a first switch coupled between a reference node and the second end of the first winding of the transformer, and operable between an ON-state and an OFF-state, and a series connection of a clamp capacitor and a second switch coupled across the first winding of the transformer, the second switch being operable between an ON-state and an OFF-state; and an inverting unit coupled to the first end of the second winding of the transformer, and operable so as to output the AC voltage output based on an induced voltage across the second winding of the transformer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
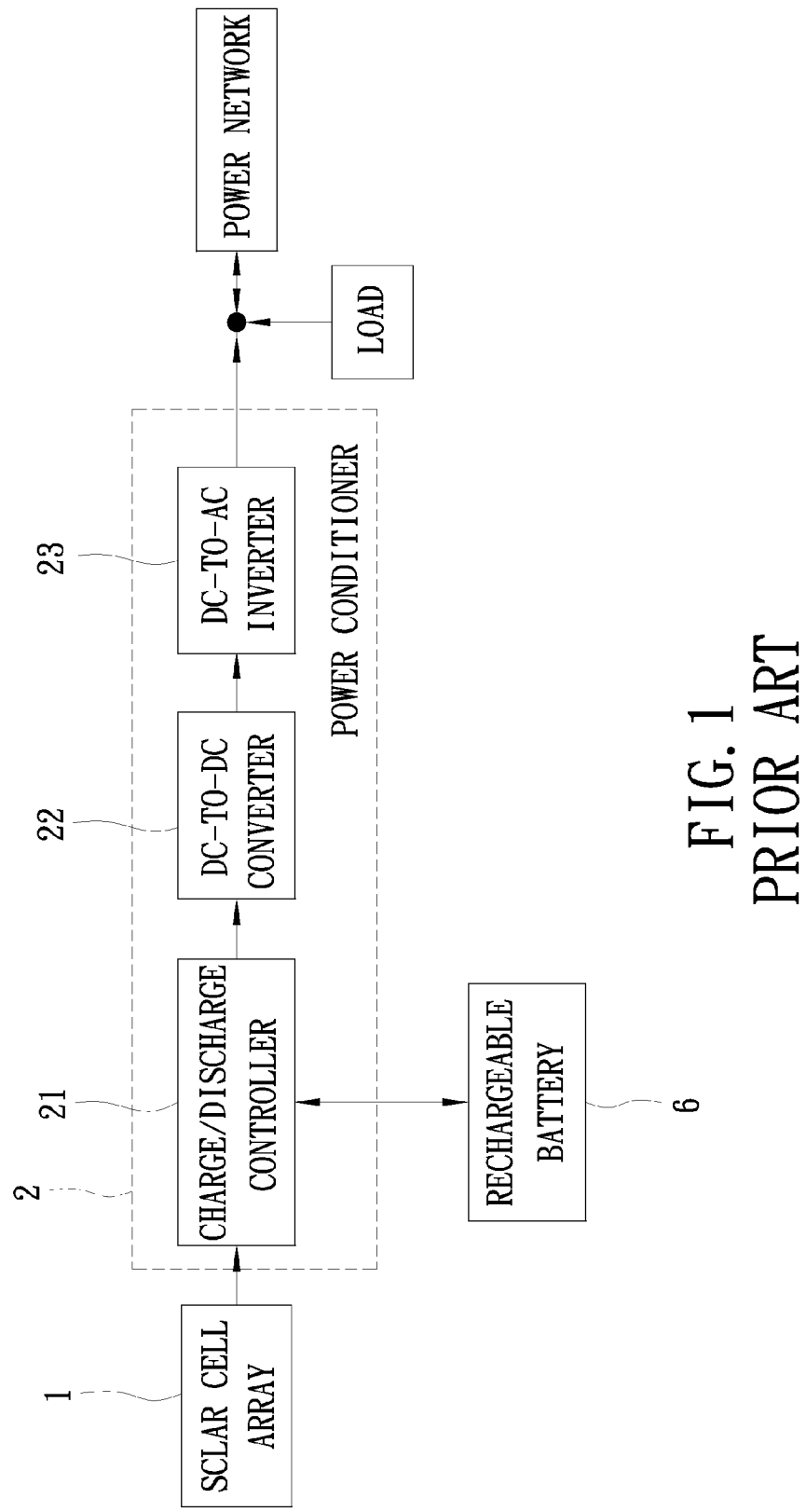
FIG. 1 is a schematic circuit block diagram illustrating a conventional solar power converting system.
Figure 2:
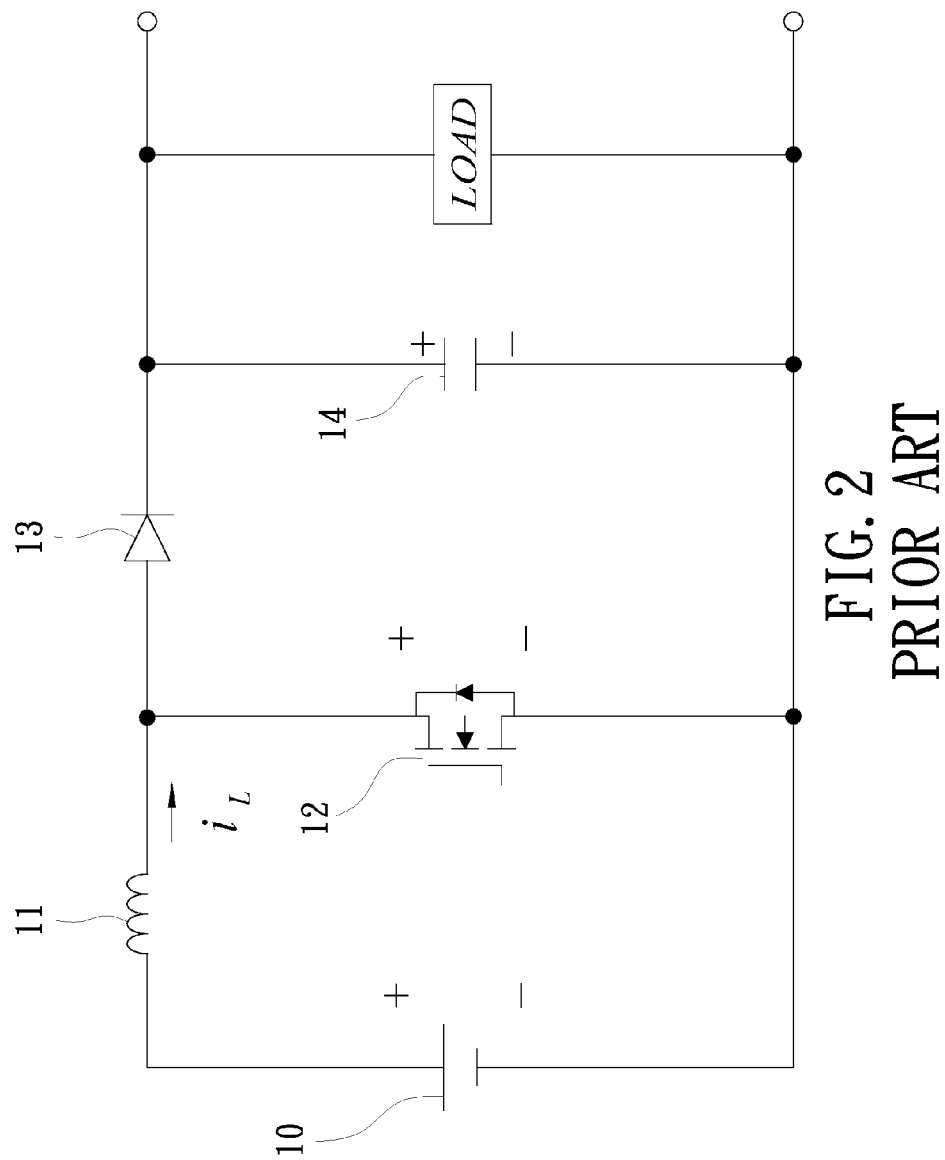
FIG. 2 is a schematic electrical circuit diagram illustrating a conventional boost device.
Figure 3:
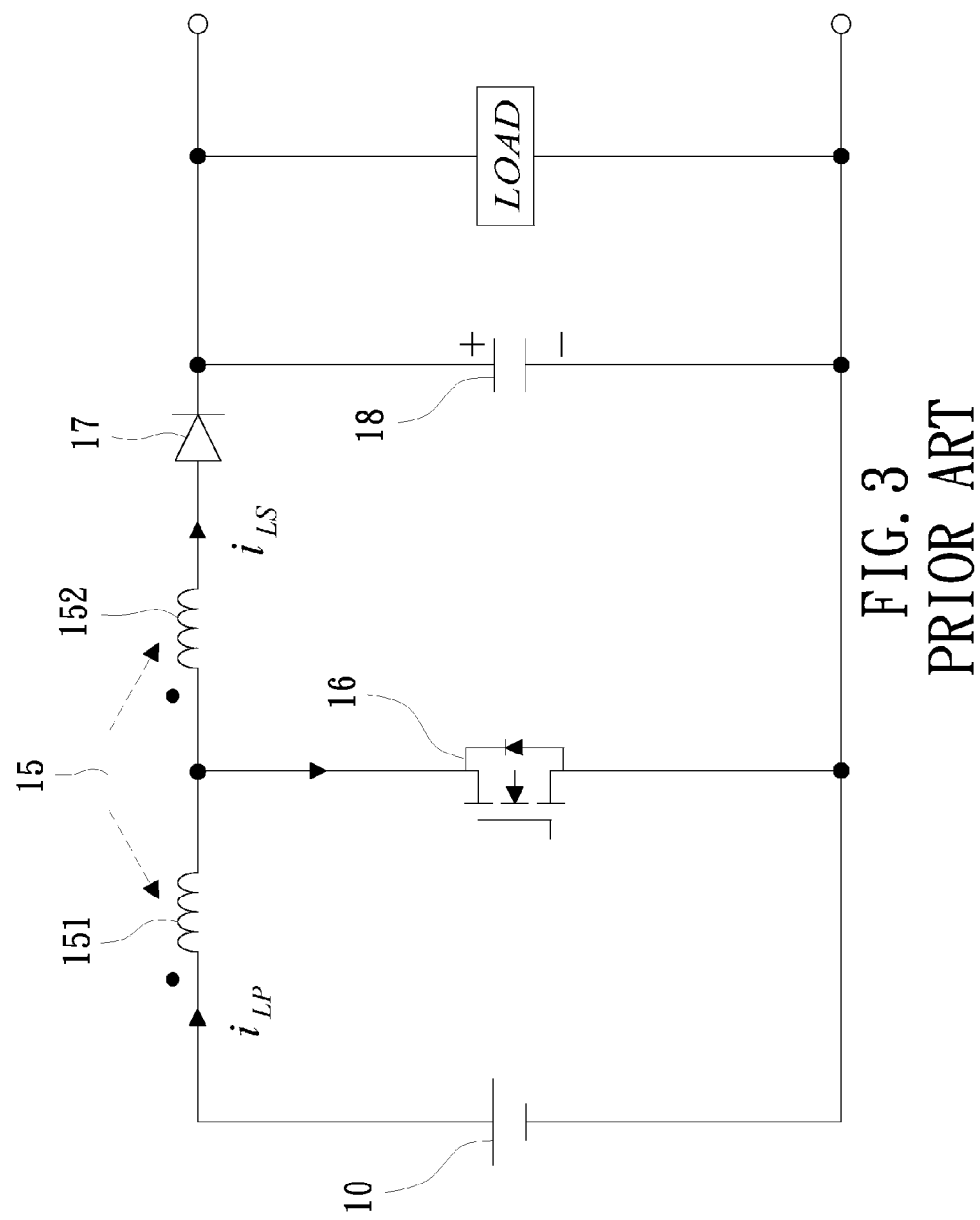
FIG. 3 is a schematic electrical circuit diagram illustrating another conventional boost device.
Figure 4:
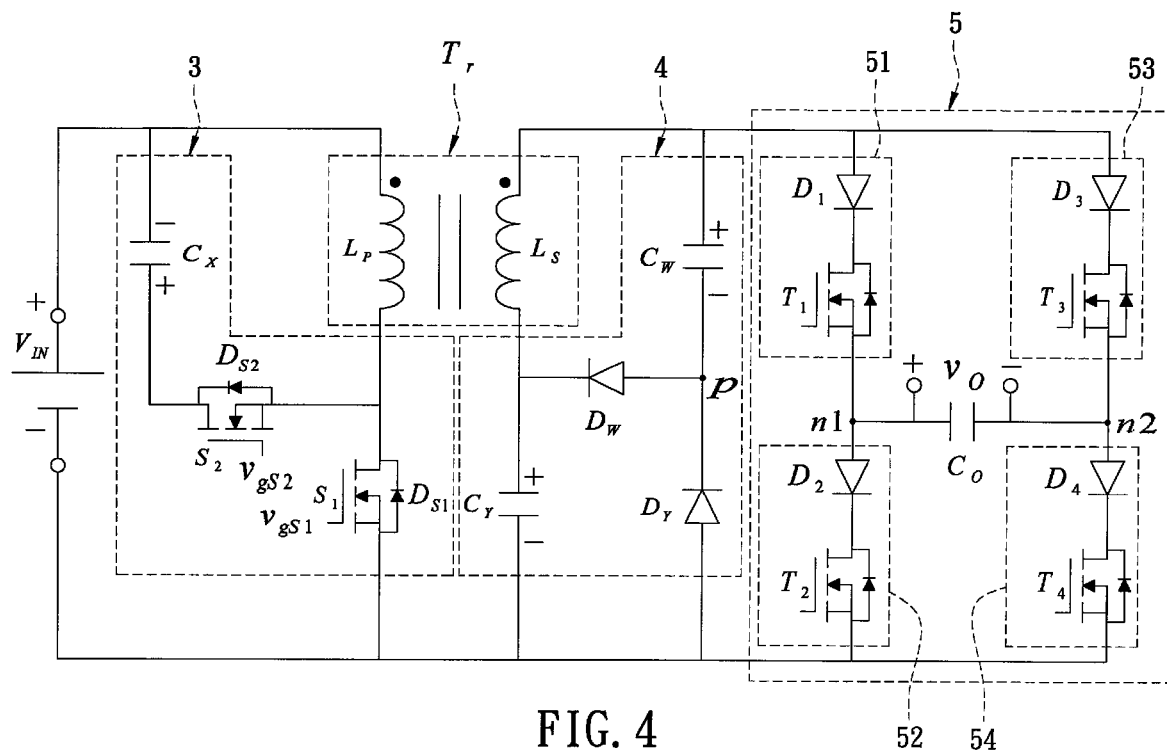
FIG. 4 is a schematic electrical circuit diagram illustrating the preferred embodiment of a power converting device according to the present invention.

Referring to FIG. 4, the preferred embodiment of a power converting device according to the present invention is shown to be adapted for converting a DC voltage input ($V_{IN}$) from an external power source into an AC voltage output, such as a sinusoidal signal. The power converting device includes a transformer ($T_r$), a clamp unit 3, an inverting unit 5, and a boost unit 4.

The transformer ($T_r$) includes first and second windings ($L_P$, $L_S$) wound around an iron core. A winding ratio of the first and second windings ($L_P$, $L_S$) is equal to 1:N. Each of the first and second windings ($L_P$, $L_S$) has a polarity end serving as a first end, and a non-polarity end serving as a second end. The polarity end of the first winding ($L_P$) is adapted to be coupled to the external power source for receiving the input voltage ($V_{IN}$). It is noted that the transformer ($T_r$) can accommodate high leakage inductance component. The first and second windings ($L_P$, $L_S$) can be separately wound in a known manner, which is much easier compared to a conventional sandwich winding manner.

The clamp unit 3 is coupled to the transformer ($T_r$) and is adapted to be coupled to the external power source. The clamp unit 3 includes a first switch ($S_1$), and a series connection of a clamp capacitor ($C_X$) and a second switch ($S_2$). The first switch ($S_1$) is coupled between a reference node, such as ground, and the non-polarity end of the first winding ($L_P$) of the transformer ($T_r$). The first switch ($S_1$) has a control end for receiving an external control signal ($v_{gS1}$), and is operable to switch between an ON-state and an OFF-state in response to the external control signal ($v_{gS1}$). The series connection of the clamp capacitor ($C_X$) and the second switch ($S_2$) is adapted to be coupled to the external power source, and is coupled in parallel to the first winding ($L_P$) of the transformer ($T_r$). The second switch ($S_2$) has a control end for receiving an external control signal ($v_{gS2}$), and is operable to switch between an ON-state and an OFF-state in response to the external control signal ($v_{gS2}$).

Figure 5:
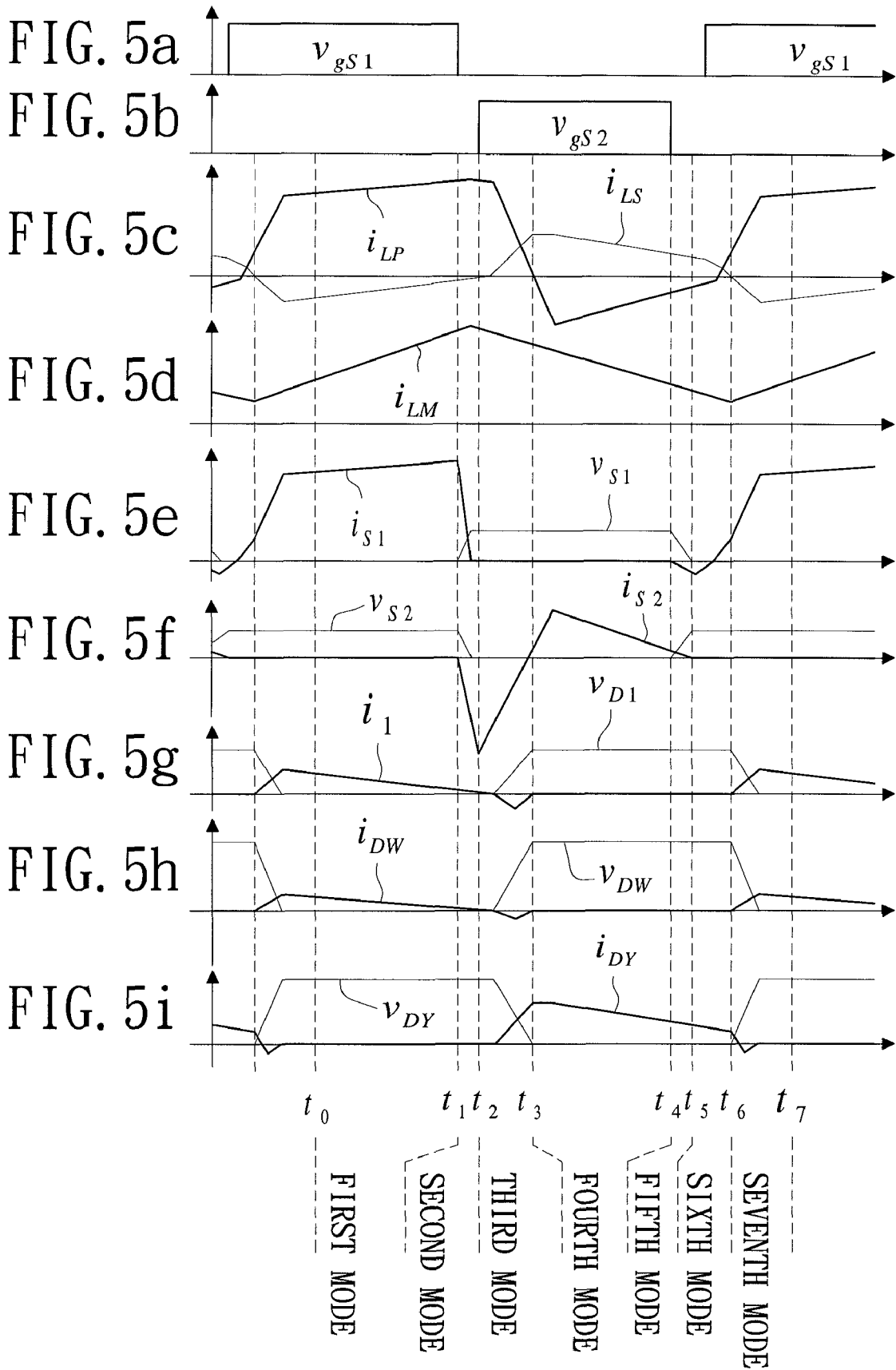
FIGS. 5a and 5b illustrate waveforms of external control signals ($v_{gS1}$, $v_{gS2}$) for first and second switches of a clamp unit of the preferred embodiment, respectively.
FIG. 5c illustrates waveforms of currents ($i_{LP}$, $i_{LS}$) flowing respectively through first and second windings of a transformer of the preferred embodiment.
FIG. 5d illustrates a waveform of an exciting current ($i_{LM}$) of the transformer of the preferred embodiment.
FIG. 5e illustrates waveforms of a current ($i_{S1}$) flowing through the first switch, and a voltage ($v_{S1}$) across the first switch.
FIG. 5f illustrates waveforms of a current ($i_{S2}$) flowing through the second switch, and a voltage ($v_{S2}$) across the second switch.
FIG. 5g illustrates waveforms of a current ($i_1$) flowing through a diode of a first switch unit of the preferred embodiment, and a voltage ($v_{D1}$) across the diode of the first switch unit.
FIG. 5h illustrates waveforms of a current ($i_{DW}$) flowing through a first diode of a boost unit of the preferred embodiment, and a voltage ($v_{DW}$) across the first diode.
FIG. 5i illustrates waveforms of a current ($i_{DY}$) flowing through a second diode of the boost unit of the preferred embodiment, and a voltage ($v_{DY}$) across the second diode.

It is noted that, based on the external control signals ($v_{gS1}$, $v_{gS2}$) shown in FIGS. 5a and 5b, the first and second switches ($S_1$, $S_2$) are operated alternately in the ON-state, and duration of the ON-state of one of the first and second switches ($S_1$, $S_2$) does not overlap duration of the ON-state of the other one of the first and second switches ($S_1$, $S_2$). In this embodiment, the first and second switches ($S_1$, $S_2$) are switched at a frequency of 100 KHz.

The inverting unit 5 is coupled to the polarity end of the second winding ($L_S$) of the transformer ($T_r$), and is operable so as to output the AC voltage output ($v_O$) based on an induced voltage across the second winding ($L_S$) of the transformer ($T_r$). The inverting unit 5 includes a full-bridge circuit and an output capacitor ($C_O$).

The full-bridge circuit has a configuration similar to that disclosed in U.S. patent application Ser. No. 12/470,246. The full-bridge circuit includes a first series connection of first and second switch units 51, 52, and a second connection of third and fourth switch units 53, 54. The first and second series connections are coupled in parallel between the polarity end of the second winding ($L_S$) of the transformer ($T_r$) and the reference node. Each of the first, second, third and fourth switch units 51, 52, 53, 54 includes a diode ($D_1$, $D_2$, $D_3$, $D_4$) and a switch ($T_1$, $T_2$, $T_3$, $T_4$) coupled in series to each other. The switch ($T_1$, $T_2$, $T_3$, $T_4$) of each of the first, second, third and fourth switch units 51, 52, 53, 54 is operable between an ON-state and an OFF-state. In this embodiment, the first switch unit 51 is coupled to the third switch unit 53, and the second switch unit 52 is coupled to the fourth switch unit 54. The diode ($D_1$, $D_3$) of each of the first and third switch units 51, 53 has an anode coupled to the polarity end of the second winding ($L_S$) of the transformer ($T_r$), and a cathode coupled to the switch ($T_1$, $T_3$) thereof. The diode ($D_2$) of the second switch unit 52 has an anode coupled to the switch ($T_1$) of the first switch unit 51, and a cathode coupled to the switch ($T_2$). The diode ($D_4$) of the fourth switch unit 54 has an anode coupled to the switch ($T_3$) of the third switch unit 53, and a cathode coupled to the switch ($T_4$). The switches ($T_1$, $T_4$) of the first and fourth switch units 51, 54 are simultaneously in the ON-state, and the switches ($T_2$, $T_3$) of the second and third switch units 52, 53 are simultaneously in the ON-state. When the switch ($T_1$) of the first switch unit 51 is in the ON-state, the switch ($T_2$) of the second switch unit 52 is in the OFF-state. It is noted that the diodes ($D_1$, $D_2$/$D_3$, $D_4$) are used to prevent short circuit. In this embodiment, the switches ($T_1$, $T_2$, $T_3$, $T_4$) are switched at a frequency of 60 Hz.

The output capacitor ($C_O$) is coupled between a first common node (n1) between the first and second switch units 51, 52, and a second common node (n2) between the third and fourth switch units 53, 54. The AC voltage output ($v_O$) is a voltage across the output capacitor ($C_O$). The output capacitor ($C_O$) is capable of being charged through the full-bridge circuit with an induced voltage across the second winding ($L_S$) of the transformer ($T_r$). When the switches ($T_1$, $T_4$) of the first and fourth switch units 51, 54 are in the ON-state, the output capacitor ($C_O$) is charged so that the AC voltage output ($v_O$) is a positive half of a sinusoidal signal. When the switches ($T_2$, $T_3$) of the second and third switch units 52, 53 are in the ON-state, the output capacitor ($C_O$) is charged so that the AC voltage output ($v_O$) is a negative half of the sinusoidal signal.

Figure 6:
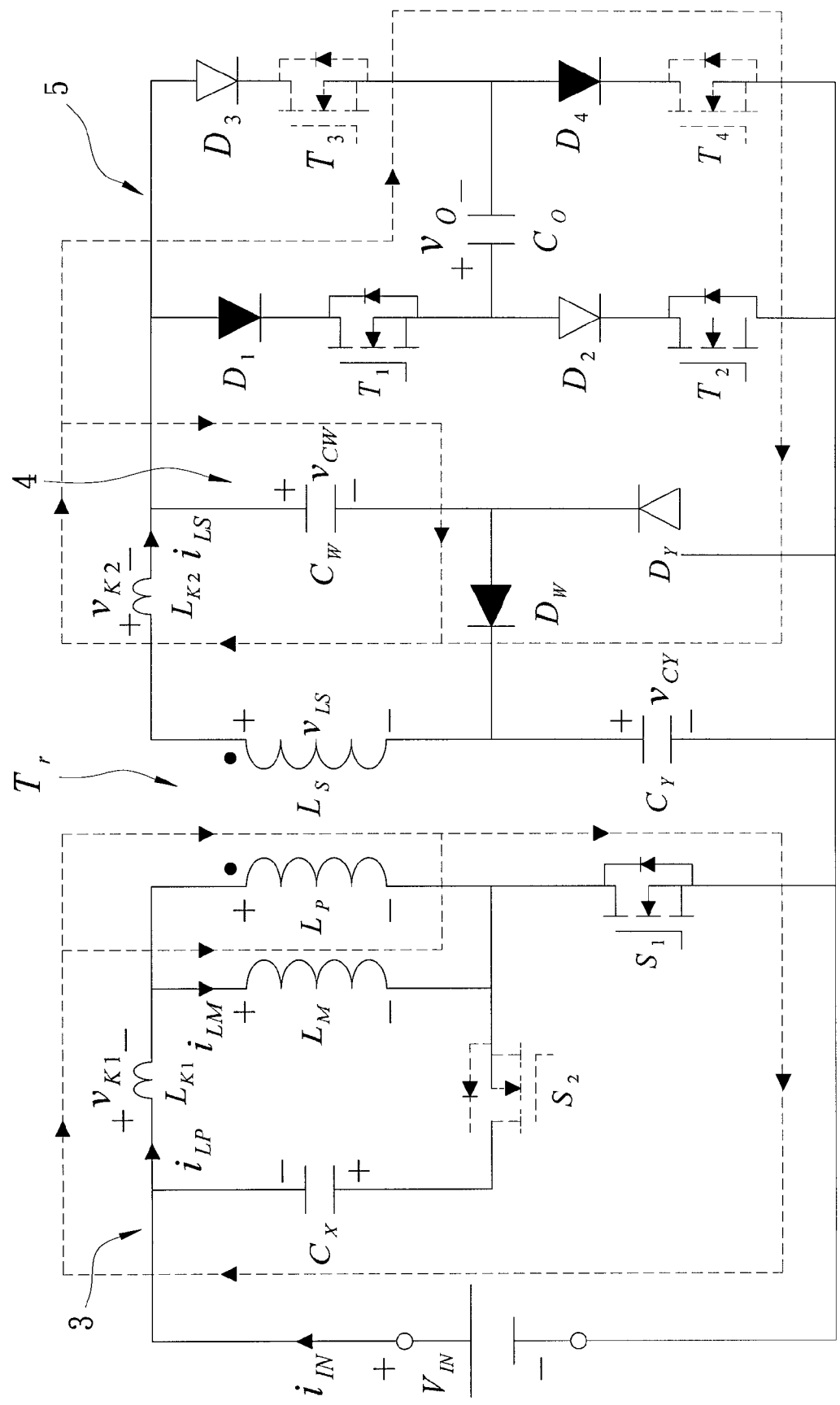
FIG. 6 is a schematic equivalent electrical circuit diagram illustrating the preferred embodiment when operated in a first mode.
Figure 7:
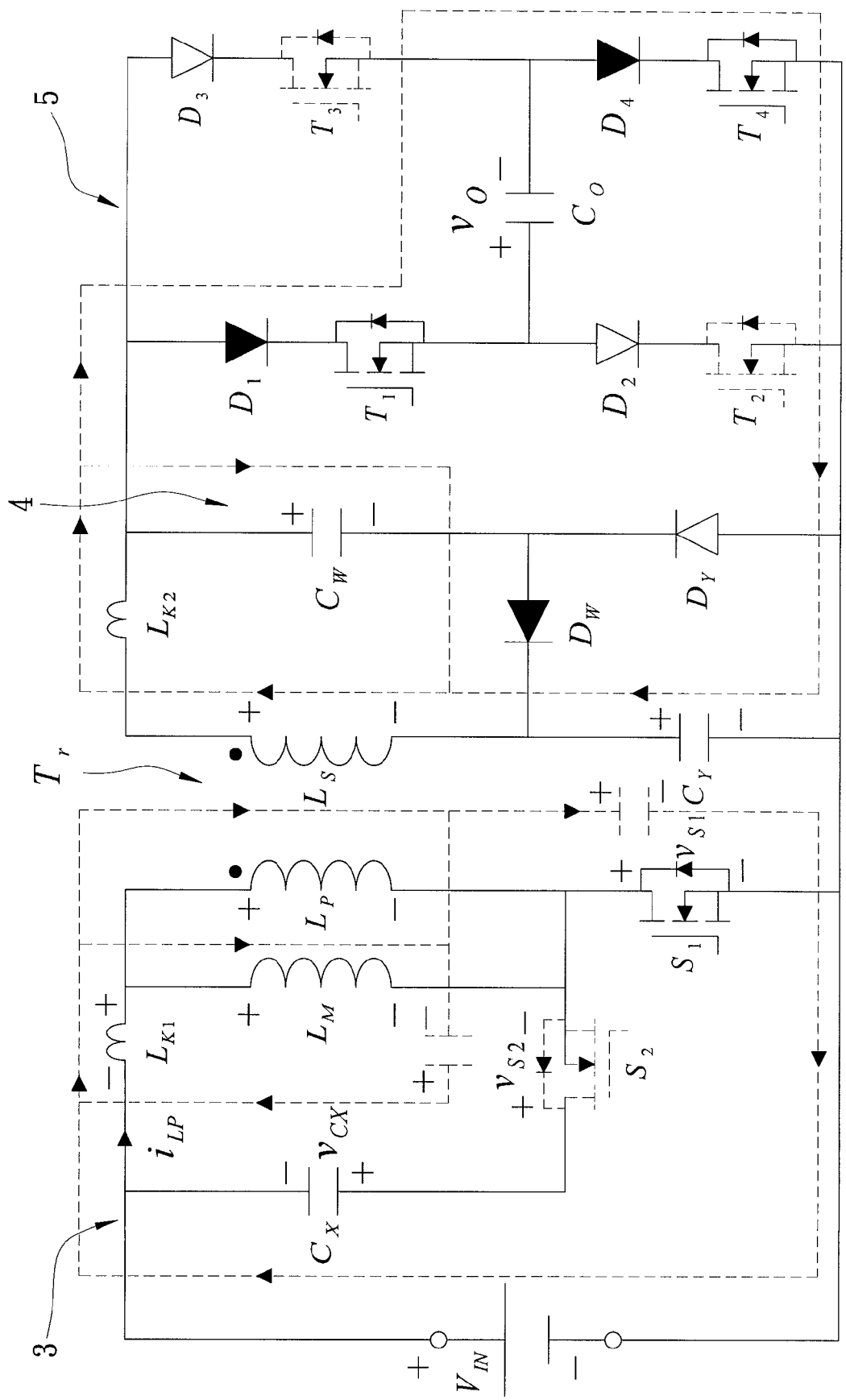
FIG. 7 is a schematic equivalent electrical circuit diagram illustrating the preferred embodiment when operated in a second mode.
Figure 8:
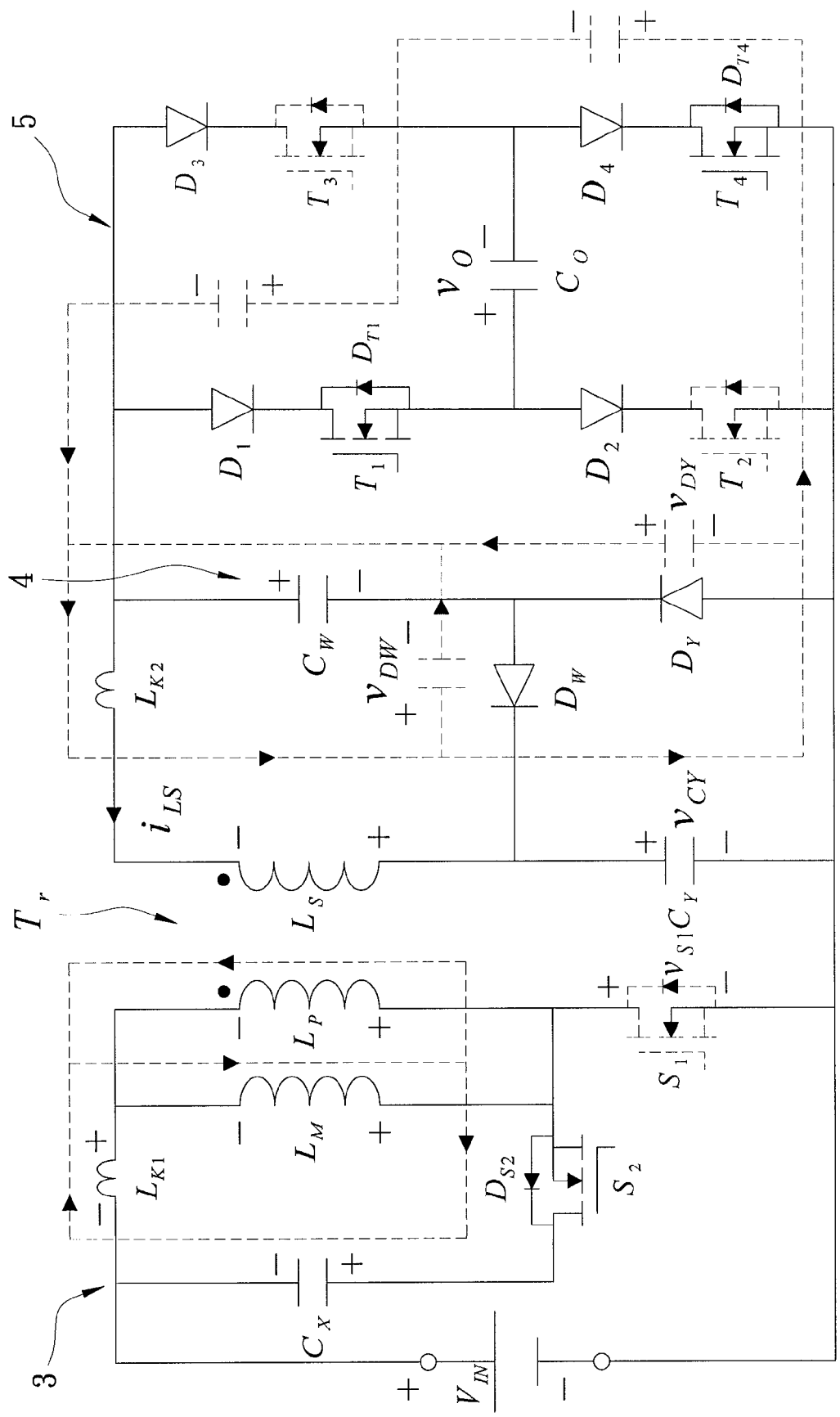
FIG. 8 is a schematic equivalent electrical circuit diagram illustrating the preferred embodiment when operated in a third mode.
Figure 9:
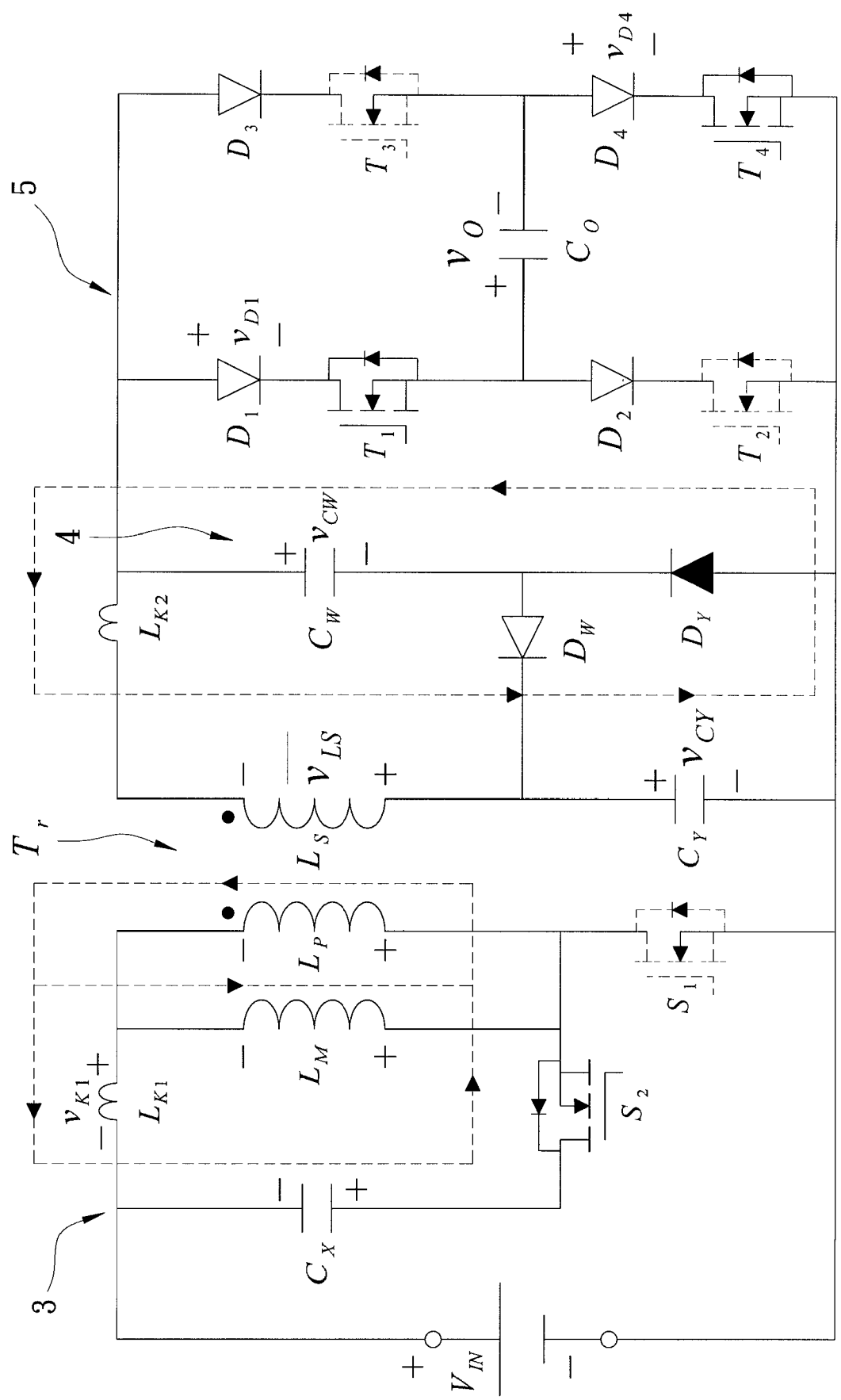
FIG. 9 is a schematic equivalent electrical circuit diagram illustrating the preferred embodiment when operated in a fourth mode.
Figure 10:
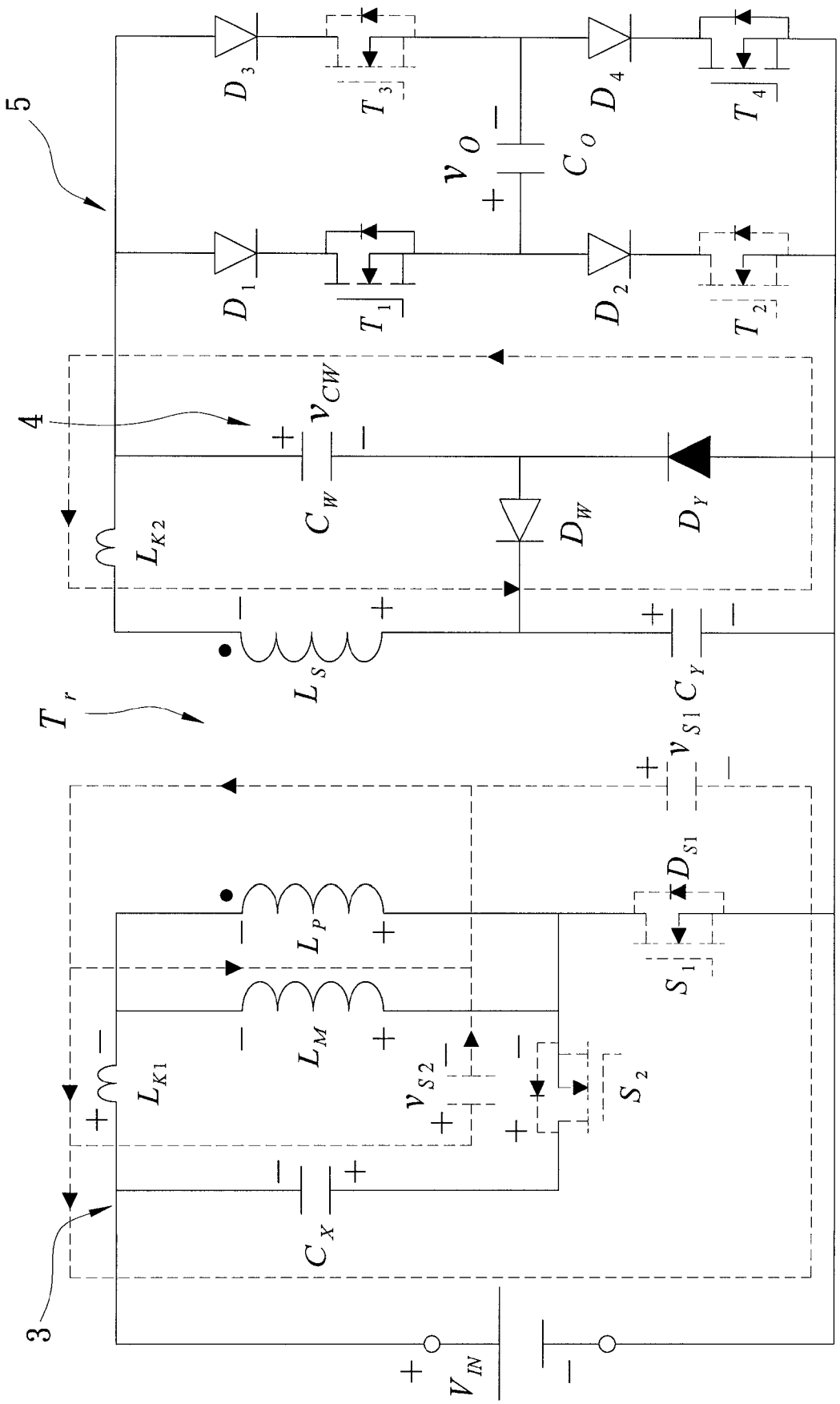
FIG. 10 is a schematic equivalent electrical circuit diagram illustrating the preferred embodiment when operated in a fifth mode.
Figure 11:
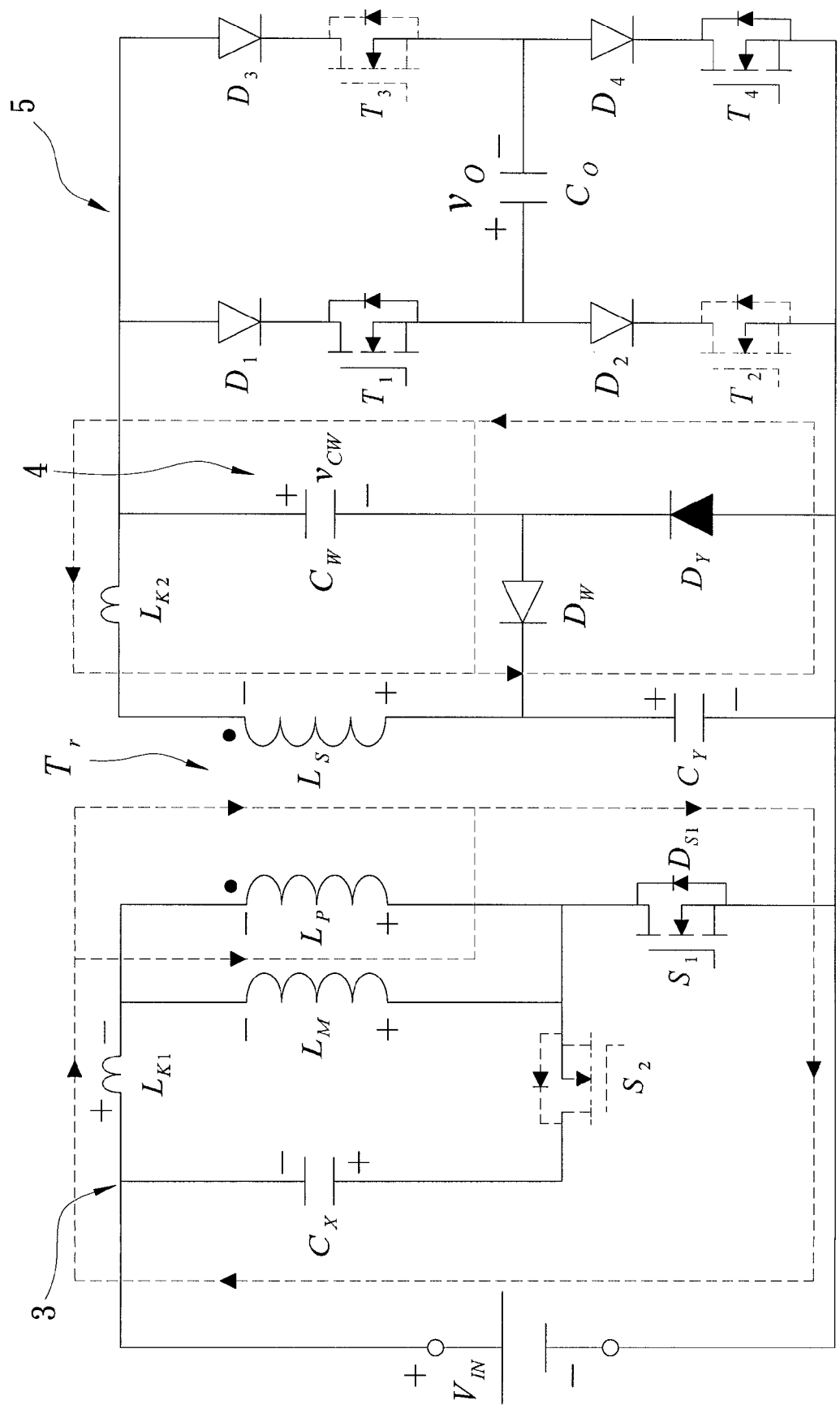
FIG. 11 is a schematic equivalent electrical circuit diagram illustrating the preferred embodiment when operated in a sixth mode.
Figure 12:
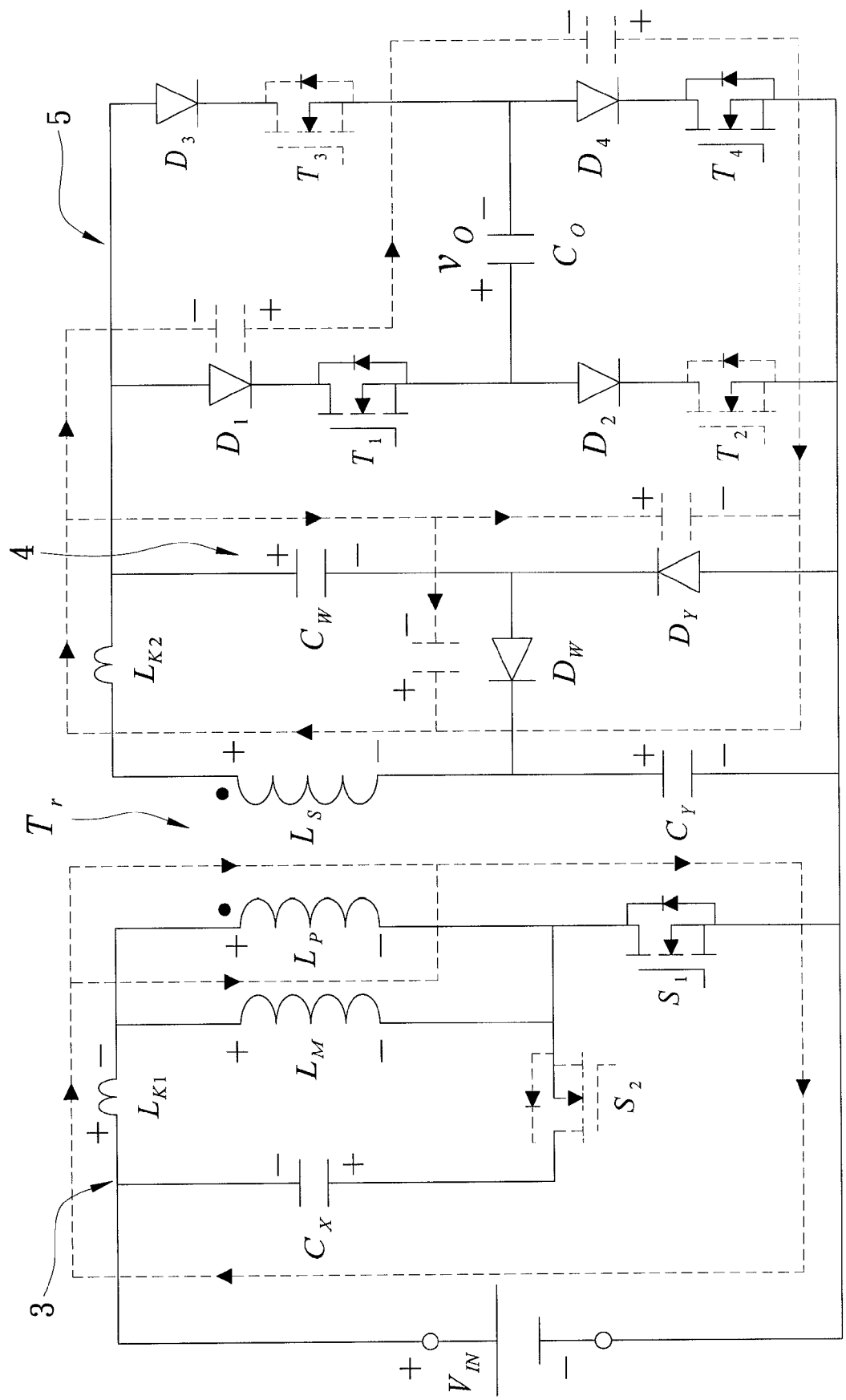
FIG. 12 is a schematic equivalent electrical circuit diagram illustrating the preferred embodiment when operated in a seventh mode.

The boost unit 4 is coupled across the second winding ($L_S$) of the transformer ($T_r$). The boost unit 4 is capable of being charged with the induced voltage across the second winding ($L_S$) of the transformer ($T_r$), and of charging the output capacitor ($C_O$) through the full-bridge circuit so as to boost the voltage across the output capacitor ($C_O$). The boost unit 4 has a configuration similar to a boost circuit disclosed in U.S. patent application Ser. No. 12/433,039, and includes a first capacitor ($C_Y$), a series connection of a first diode ($D_W$) and a second capacitor ($C_W$), and a second diode ($D_Y$). The first capacitor ($C_Y$) is coupled between the non-polarity end of the second winding ($L_S$) of the transformer ($T_r$) and the reference node. It is noted that the output capacitor ($C_O$) is further charged through the full-bridge circuit with a voltage across the first capacitor ($C_Y$) when the output capacitor ($C_O$) is charged with the induced voltage across the second winding ($L_S$) of the transformer ($T_r$), as best shown in FIGS. 6 and 7. The series connection of the first diode ($D_W$) and the second capacitor ($C_W$) is coupled in parallel to the second winding ($L_S$) of the transformer ($T_r$). The first diode ($D_W$) has an anode coupled to the second capacitor ($C_W$), and a cathode coupled to the non-polarity end of the second winding ($L_S$) of the transformer ($T_r$). When the output capacitor ($C_O$) is charged through the full-bridge circuit with the induced voltage across the second winding ($L_S$) of the transformer ($T_r$), the second capacitor ($C_W$) is charged through the first diode ($D_W$) with the induced voltage across the second winding ($L_S$) of the transformer ($T_r$), as best shown in FIGS. 6 and 7. The second diode ($D_Y$) has an anode coupled to the reference node, and a cathode coupled to a common node (p) between the anode of the first diode ($D_W$) and the second capacitor ($C_W$). The first capacitor ($C_Y$) is capable of being charged through the second diode ($D_Y$) with a voltage ($V_{CW}$) across the second capacitor ($C_W$), as best shown in FIGS. 9, 10 and 11. It is noted that the first diode ($D_W$) and the second diode ($D_Y$) do not conduct simultaneously.

The boost unit 4 of the preferred embodiment is operable among first to seventh modes based on the external control signals ($v_{gs1}$, $v_{gs2}$) for the first and second switches ($S_1$, $S_2$) of the clamp unit 4 shown in FIGS. 5a and 5b. FIG. 5d illustrates a waveform of an exciting current ($i_{LM}$) of the transformer ($T_r$). FIG. 5c illustrates waveforms of currents ($i_{LP}$, $i_{LS}$) flowing respectively through the first and second windings ($L_p$, $L_s$) of the transformer ($T_r$). FIG. 5e illustrates waveforms of a current ($i_{s1}$) flowing through the first switch ($S_i$), and a voltage ($v_{s1}$) across the first switch ($S_1$). FIG. 5f illustrates waveforms of a current ($i_{s2}$) flowing through the second switch ($S_2$), and a voltage ($v_{s2}$) across the second switch ($S_2$). FIG. 5g illustrates waveforms of a current ($i_1$) flowing through the diode ($D_1$) of the first switch unit 51, and a voltage ($v_{D1}$) across the diode ($D_1$). FIG. 5h illustrates waveforms of a current ($i_{Dw}$) flowing through the first diode ($D_w$) of the boost unit 4, and a voltage ($v_{DW}$) across the first diode ($D_w$). FIG. 5i illustrates waveforms of a current ($i_{DY}$) flowing through the second diode ($D_y$) of the boost unit 4, and a voltage ($v_{DY}$) across the second diode ($D_y$).

Referring further to FIGS. 5a to 5i, and 6, the boost unit 4 is operated in the first mode during a period from $t_0$ to $t_1$. In FIG. 6, $L_M$ represents an exciting inductance of the transformer ($T_r$), $L_{k1}$ represents a leakage inductance of the first winding ($L_P$), and $L_{k2}$ represents a leakage inductance of the second winding ($L_S$). Therefore, a coupling coefficient (k) is represented as follows:

$$k = L_M/(L_{k1}+L_M) = L_M/L_1 \quad \text{(Equation 1)}$$

where $L_1$ is an inductance of the first winding ($L_P$). In the first mode, the first switch ($S_1$) is in the ON-state, the second switch ($S_2$) is in the OFF-state, and the diodes ($D_1$, $D_4$) and the first diode ($D_W$) conduct. The first winding ($L_P$) is excited by a current ($i_{IN}$) from the external power source to generate an induced voltage equal to $V_{IN}$ across the first winding ($L_P$). Thus, the induced voltage ($v_{LS}$) across the second winding ($L_S$) is represented as follows:

$$v_{LS} = N(V_{IN} - v_{k1}) \quad \text{(Equation 2)}$$

where $v_{k1}$ is a voltage across the leakage inductance ($L_{k1}$). At the same time, the second capacitor ($C_W$) is charged through the first diode ($D_W$) with the induced voltage ($v_{LS}$) across the second winding ($L_S$) to $N(V_{IN}-v_{k1})$ so as to clamp a voltage across the second diode ($D_Y$). Thus, the voltage ($v_{CW}$) across the second capacitor ($C_W$) is represented as follows:

$$v_{CW} = v_{LS} - v_{k2} = NV_{IN} - 2Nv_{k1} \quad \text{(Equation 3)}$$

where $v_{k2}$ is a voltage across the leakage inductance ($L_{k2}$). In this case, the output capacitor ($C_O$) is charged through the first and fourth switch units 51, 54 with the induced voltage ($v_{LS}$) across the second winding ($L_S$), and the voltage ($v_{CY}$) across the first capacitor ($C_Y$). Therefore, the AC voltage output ($v_O$) is represented as follows:

$$v_O = v_{CY} + v_{LS} \quad \text{(Equation 4)}$$

($v_{CY}$ is equal to $NV_{IN}/(1-d)-2Nv_{k1}$ which will be described in detail later, where d is a duty cycle of the first switch ($S_1$)). In the first mode, the current ($i_{LP}$) flowing through the first winding ($L_P$) includes the exciting current ($i_{LM}$) and an induced current. When the waveform of the current ($i_{s1}$) flowing through the first switch ($S_1$) is close to being a square shape through appropriate configuration of the exciting inductance ($L_M$) and the coupling coefficient (k), the first switch ($S_1$) has relatively low conduction loss and switching loss.

Referring to FIGS. 5a to 5i, and 7, the boost unit 4 is operated in the second mode during a period from $t_1$ to $t_2$. In the second mode, the first and second switches ($S_1$, $S_2$) are in the OFF-state, and the diodes ($D_1$, $D_4$) and the first diode ($D_W$) conduct. Energy attributed to the leakage inductance ($L_{k1}$) of the first winding ($L_P$) is released to the transformer ($T_r$) such that the second winding ($L_S$) is operated as in the first mode. In this case, the current ($i_{LP}$) flowing through the first winding ($L_P$) begins to charge a parasitic capacitance of the first switch ($S_1$) such that the voltage ($v_{S1}$) across the first switch ($S_1$) rises (see FIG. 5e). On the other hand, a parasitic capacitance of the second switch ($S_2$) discharges such that the voltage ($v_{S2}$) across the second switch ($S_2$) reduces to zero (see FIG. 5f). Thus, a sum of the voltage ($v_{S1}$) across the first switch ($S_1$) and the voltage ($v_{S2}$) across the second switch ($S_2$) is equal to a sum of a voltage ($v_{CX}$) across the clamp capacitor ($C_X$) and the DC voltage input ($V_{IN}$). That is, $$v_{S1}+v_{S2}=V_{IN}+v_{CX} \quad \text{(Equation 5)}$$

Referring to FIGS. 5a to 5i, and 8, the boost unit 4 is operated in the third mode during a period from $t_2$ to $t_3$. In the third mode, the first switch ($S_1$) is in the OFF-state, and the second switch ($S_2$) is in the ON-state. When the voltage ($v_{S2}$) across the second switch ($S_2$) is zero, a substrate diode ($D_{S2}$) of the second switch ($S_2$) conducts such that the current ($i_{LX}$) flowing through the inductor ($L_X$) and the current ($i_{LP}$) flowing through the first winding ($L_P$) flow to the clamp capacitor ($C_X$). Thus, the voltage ($v_{S1}$) across the first switch ($S_1$) is clamped. When the duty cycle of the first switch ($S_1$) is represented by "d", based on the voltage-second theorem, the voltage ($v_{CX}$) across the clamp capacitor ($C_X$) is determined according to the following Equation 2:

$$v_{CX}=V_{IN}d/(1-d) \quad \text{(Equation 6)}$$

According to the Equations 5 and 6, a maximum value of the voltage ($v_{S1}$) across the first switch ($S_1$) is represented as follows:

$$v_{S1}=V_{IN}+v_{CX}=V_{IN}/(1-d) \quad \text{(Equation 7)}$$

Since energy attributed to the leakage inductance ($L_{K1}$) of the first winding ($L_P$) is released, the current ($i_{LS}$) flowing through the first winding ($L_P$) decreases to zero at $t_3$ (see FIG. 5c). The voltage ($v_{LS}$) across the second winding ($L_S$) is represented as follows:

$$v_{LS}=NV_{IN}d/(1-d) \quad \text{(Equation 8)}$$

The current ($i_{LS}$) flowing through the second winding ($S_2$) is reversed and gradually increases such that a parasitic capacitance of the second diode ($D_Y$) of the boost unit 4 discharges and that a parasitic capacitance of the first diode ($D_W$) is charged. Therefore, the relationship among the voltage ($v_{DW}$) across the first diode ($D_W$), the voltage ($v_{DY}$) across the second diode ($D_Y$) and the voltage ($v_{CY}$) across the first capacitor ($C_Y$) is determined according to the following equation 9:

$$v_{DW}+v_{DY}=v_{CY} \quad \text{(Equation 9)}$$

According to the Equation 3, the voltages ($v_{DW}$, $v_{DY}$) across the first and second diodes ($D_W$, $D_Y$) clamp each other, and each of the voltages ($v_{DW}$, $v_{DY}$) across the first and second diodes ($D_W$, $D_Y$) has a maximum value equal to $v_{CY}$. In this case, a part of the current ($i_{LS}$) flowing through the second winding ($L_S$) flows through the output capacitor ($C_O$) and substrate diodes ($D_{T4'}$, $D_{T1'}$) of the switches ($T_4$, $T_1$) such that parasitic capacitances of the diodes ($D_4$, $D_1$) are charged with a small amount of current. Thus, the diodes ($D_4$, $D_1$) become cut off. During the third mode, the first and second diodes ($D_Y$, $D_W$) and the diodes ($D_1$, $D_2$, $D_3$, $D_4$) have a very small reversed recovery current as a result of the leakage inductance ($L_{k2}$).

Referring to FIGS. 5a to 5i, and 9, the boost unit 4 is operated in the fourth mode during a period from $t_3$ to $t_4$. In the fourth mode, the first switch ($S_1$) is in the OFF-state, the second switch ($S_2$) is in the ON-state, and the second diode ($D_Y$) conducts. The current ($i_{LP}$) flowing through the first winding ($L_P$) decreases to zero at $t_3$, and then reversely increases. In this case, the clamp capacitor ($C_X$) discharges through the second switch ($S_2$). The current ($i_{CX}$) flowing through the clamp capacitor ($C_X$) and the exciting current ($i_{LM}$) reversely flow to the first winding ($L_P$). Thus, the induced voltage ($v_{LS}$) across the second winding ($L_S$) is equal to N times the voltage ($v_{CX}$) across the clamp capacitor ($C_X$), and the first capacitor ($C_Y$) is charged through the second diode ($D_Y$) with the induced voltage ($v_{LS}$) across the second winding ($L_S$) and the voltage ($v_{CW}$) across the second capacitor ($C_W$). Referring to the Equations 2 and 5, the voltage ($v_{CY}$) across the first capacitor ($C_Y$) is determined according to the following Equation 10:

$$v_{CY}=v_{LS}+v_{CW}=NV_{IN}/(1-d)-2NV_{k1} \quad \text{(Equation 10)}$$

According to the Equation 3, the voltages ($v_{D1}$, $v_{D4}$) across the diodes ($D_1$, $D_4$) are determined according to the following Equation 11:

$$v_{D1}+v_{D4}=v_O-v_{CW}-NV_{IN} \quad \text{(Equation 11)}$$

Referring to FIGS. 5a to 5i, and 10, the boost unit 4 is operated in the fifth mode during a period from $t_4$ to $t_5$. In the fifth mode, the first and second switches ($S_1$, $S_2$) are in the OFF-state, and the second diode ($D_Y$) conducts. The parasitic capacitance of the second switch ($S_2$) is charged and the parasitic capacitance of the first switch ($S_1$) discharges. When the parasitic capacitance of the first switch ($S_1$) discharges to zero, the substrate diode ($D_{S1}$) of the first switch ($S_1$) conducts such that the voltage ($v_{S2}$) across the second switch ($S_2$) is clamped to $V_{IN}+v_{CX}$. Therefore, the second switch ($S_2$) has the same clamp voltage as that of the first switch ($S_1$).

Referring to FIGS. 5a to 5i, and 11, the boost unit 4 is operated in the sixth mode during a period from $t_5$ to $t_6$. In the sixth mode, the first switch ($S_1$) is switched from the OFF-state to the ON-state, the second switch ($S_2$) is in the OFF-state, and the second diode ($D_Y$) conducts. When the first switch ($S_1$) is switched from the OFF-state to the ON-state, due to the leakage inductance ($L_{k1}$), an inrush current can be avoided. Therefore, the current ($i_{LP}$) flowing through the first winding ($L_P$) cannot become positive at once such that the second winding ($L_S$) is operated as in the fifth mode. Energy attributed to the exciting inductance ($L_M$) decreases and is released to the second winding ($L_S$). Since the substrate diode ($D_{S1}$) of the first switch ($S_1$) still conducts, as shown in FIG. 5e, the first switch ($S_1$) has zero-voltage switching characteristics during transformation from the OFF-state to the ON-state.

Referring to FIGS. 5a to 5i, and 12, the boost unit 4 is operated in the seventh mode during a period from $t_6$ to $t_7$. In the seventh mode, the first switch ($S_1$) is in the ON-state and the second switch ($S_2$) is in the OFF-state. When the current ($i_{LP}$) flowing through the first winding ($L_P$) has an amplitude equal to that of the exciting current ($i_{LM}$) of the transformer ($T_r$), the first winding ($L_P$) receives energy again such that the current ($i_{LS}$) flowing through the second winding ($L_S$) linearly increases. At the same time, the voltage across the exciting inductance ($L_M$) is induced to the second winding ($L_S$) through the first winding ($L_P$) such that the current flowing through the second winding ($L_S$) reversely increases again. In this case, the parasitic capacitances of the first diode ($D_W$) and the diodes ($D_1$, $D_4$) discharge, and the parasitic capacitance of the second diode ($D_Y$) is charged.

When the parasitic capacitances of the first diode ($D_W$) and the diodes ($D_1$, $D_4$) discharge to zero, the first diode ($D_W$) and the diodes ($D_1$, $D_4$) conduct such that the output capacitor ($C_O$) and the second capacitor ($C_W$) are charged through the diodes ($D_1$, $D_4$) with the current flowing through the second winding ($L_S$). Charging paths are the same as that of the first mode. When the exciting current of the transformer ($T_r$) gradually increases, the induced current flowing through the second winding ($L_S$) gradually decreases, and then, the boost unit 4 returns to the first mode.

According to the Equations 3 and 10, the output voltage ($v_O$) is represented as follows:

$$v_O = v_{CW} + v_{CY} = NV_{IN}\frac{(2-d)}{(1-d)} - 4Nv_{k1} \quad \text{(Equation 12)}$$

Thus, a voltage gain ($G_V$) of the power converting device is represented as follows:

$$G_V = \frac{|v_O|}{V_{IN}} = N\frac{(2-d)}{(1-d)} - \frac{4Nv_{k1}}{V_{IN}} \quad \text{(Equation 13)}$$

where $0 \leq d < 1$ such that $$N\frac{(2-d)}{(1-d)}$$

is greater than 2N.

According to the Equation 13, by appropriately selecting d and $v_{k1}$, the voltage gain ($G_V$) of less than one can be obtained. Therefore, the power converting device of the present invention can further provide step-down function.

Figures 13A, 13B:
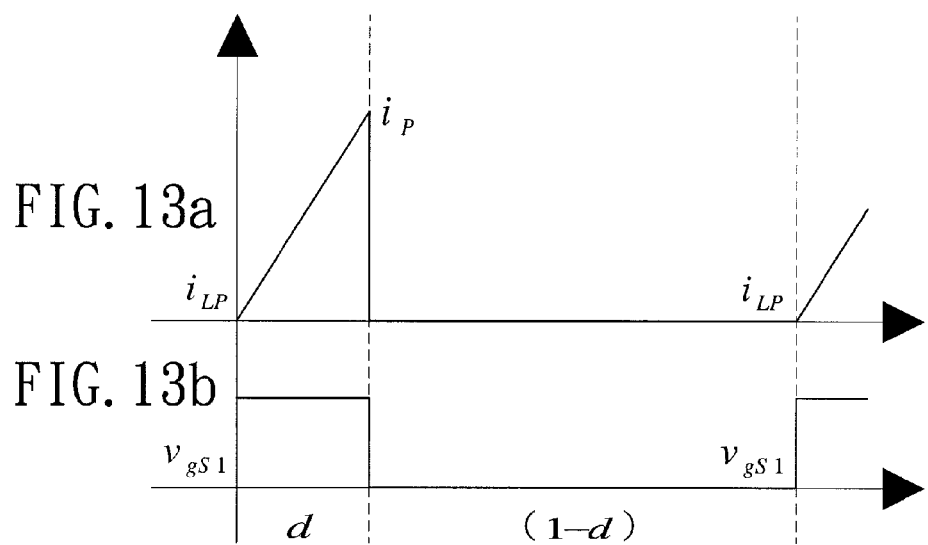
FIGS. 13a and 13b illustrate respectively waveforms of the current ($i_{LP}$) flowing through the first winding ($L_P$) and a control signal ($v_{gS1}$) for the first switch when in a step-down operation.

When the power converting device is in a step-down operation, referring to FIGS. 13a and 13b, if the external power source, such as a solar cell unit, provides the current ($i_{IN}$) during the ON-state of the first switch ($S_1$), $i_{AVG}$ represents an average current during one cycle. $V_O$ and $I_O$ represent effective values of the voltage across the output capacitor ($C_O$) and the current flowing through the output capacitor ($C_O$), respectively. R represents an impedance of a load (not shown). $P_{IN}$ and $P_O$ represent input and output powers, respectively. $\eta$ represents a power transformation efficiency of the power converting device. As a result, $P_{IN} \cdot \eta = P_O$. To simplify analysis, assuming $\eta = 1$, the relationship between the input and output powers ($P_{IN}$, $P_O$) is represented as follows:

$$P_{IN} = P_O \quad \text{(Equation 14)}$$

$$V_{IN} \cdot i_{AVG} = V_O \cdot I_O = V_O^2/R \quad \text{(Equation 15)}$$

Since the second switch ($S_2$) is in the OFF-state, $i_{AVG} = i_{LP}$. Therefore, the Equation 15 can be represented as follows:

$$V_{IN} \cdot \frac{d \cdot i_P}{2} = \frac{V_O^2}{R} \quad \text{(Equation 16)}$$

where $i_P$ is a maximum value of $i_{LP}$. Thus, $i_P$ can be represented as follows:

$$i_P = \frac{2 \cdot V_O^2}{R \cdot V_{IN} \cdot d} \quad \text{(Equation 17)}$$

Referring to the Equation 4, $v_{k1}$ can be represented as follows:

$$v_{k1} = L_{k1}\frac{\Delta i_P}{dt} = \frac{2 \cdot L_1(1-k) \cdot V_O^2}{R \cdot V_{IN} \cdot d^2 \cdot T} \quad \text{(Equation 18)}$$

where T is a period of one cycle of $v_{GS1}$, i.e., a reciprocal of the switching frequency ($f_S$) of the first switch ($S_1$). The Equation 18 is introduced into the Equation 13, the voltage gain ($G_V$) of the power converting device can be represented as follows:

$$G_V = \frac{v_O}{V_{IN}} = N\frac{(2-d)}{(1-d)} - 8N\frac{L_1(1-k) \cdot V_O^2 \cdot f_S}{R \cdot V_{IN}^2 \cdot d^2} \quad \text{(Equation 19)}$$

Then, the Equation 20 can be determined as follows:

$$\frac{8N \cdot L_1(1-k) \cdot f_S}{R \cdot d^2} \cdot G_V^2 + G_V - \frac{N(2-d)}{(1-d)} = 0 \quad \text{(Equation 20)}$$

In the Equation 20, assuming that $$a = \frac{8N \cdot L_1(1-k) \cdot f_S}{R \cdot d^2}$$

$$b = 1$$

$$c = -\frac{N(2-d)}{(1-d)},$$

since $G_V > 0$, the Equation 20 has a solution of $G_V$ as follows:

$$G_V = \frac{-b + \sqrt{b^2 - 4 \cdot a \cdot c}}{2 \cdot a}, \text{ or}$$

$$G_V = \left[\frac{R \cdot d^2}{16N(1-k)L_P \cdot f_S}\right] \cdot \left[-1 + \sqrt{1 + \frac{32N^2(2-d)(1-k)L_P \cdot f_S}{(1-d)(R \cdot d^2)}}\right]$$

Figure 14:
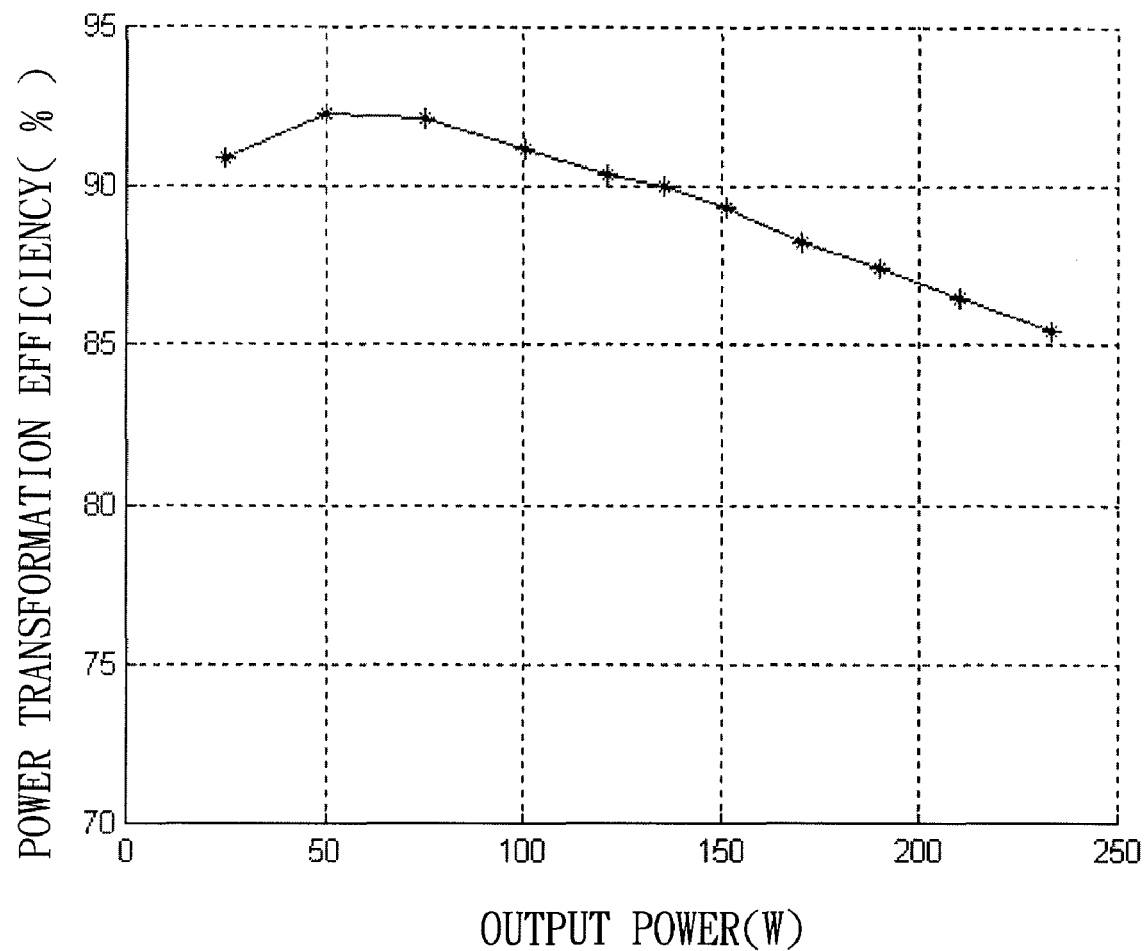
FIG. 14 is a plot illustrating experimental results of power transformation efficiency of the preferred embodiment for a DC voltage input of 18 Volts.

FIG. 14 illustrates experimental results of power transformation efficiency ($\eta$) of the power converting device of the preferred embodiment operated under a condition, where the DC voltage input ($V_{IN}$) is 18 volts. As shown in FIG. 14, the power converting device has maximum power transformation efficiency ($\eta$) over 92%.

The following are some of the advantages attributed to the power converting device of the present invention:

1. The first and second switches ($S_1$, $S_2$), the first and second diodes ($D_W$, $D_Y$), and the diodes ($D_1$, $D_2$, $D_3$, $D_4$) have soft switching characteristics.

2. Due to the presence of the transformer ($T_r$), the power converting device of the present invention has electrical isolation capability.

3. The power converting device of the present invention has relatively high power transformation efficiency.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power converting device for converting a DC voltage input from an external power source into an AC voltage output, said device comprising:
a transformer having first and second windings, each having opposite first and second ends, said first end of said first winding being adapted to be coupled to the external power source;
a clamp unit coupled to said transformer and adapted to be coupled to the external power source, said clamp unit including a first switch coupled between a reference node and said second end of said first winding of said transformer, and operable between an ON-state and an OFF-state, and a series connection of a clamp capacitor and a second switch coupled across said first winding of said transformer, said second switch being operable between an ON-state and an OFF-state; and an inverting unit coupled to said first end of said second winding of said transformer, and operable so as to output the AC voltage output based on an induced voltage across said second winding of said transformer wherein said inverting unit includes a full-bridge circuit including a first series connection of first and second switch units, and a second series connection of third and fourth switch units, said first and second series connections being coupled in parallel between said first end of said second winding of said transformer and said reference node, each of said first, second, third and fourth switch units including a diode and a switch coupled in series to each other, said switch of each of said first, second, third and fourth switch units being operable between an ON-state and an OFF-state, and an output capacitor coupled between a first common node between said first and second switch units, and a second common node between said third and fourth switch units, the AC voltage output being a voltage across said output capacitor, said output capacitor being capable of being charged through said full-bridge circuit with the induced voltage across said second winding of said transformer;

said power converting device further comprising a boost unit coupled across said second winding of said transformer, said boost unit being capable of being charged with the induced voltage across said second winding of said transformer, and of charging said output capacitor through said full-bridge circuit so as to boost the voltage across said output capacitor, said boost unit including a first capacitor coupled between said second end of said second winding of said transformer and said reference node, said output capacitor being further charged with a voltage across said first capacitor when said output capacitor is charged with the induced voltage across said second winding of said transformer, a series connection of a first diode and a second capacitor coupled in parallel to said second winding of said transformer, said first diode having an anode coupled to said second capacitor, and a cathode coupled to said second end of said second winding of said transformer, said second capacitor being capable of being charged through said first diode with the induced voltage across said second winding of said transformer when said output capacitor of said inverting unit is charged with the induced voltage across said second winding of said transformer, and a second diode having an anode coupled to said reference node, and a cathode coupled to a common node between said anode of said first diode and said second capacitor, said first capacitor being capable of being charged through said second diode with a voltage across said second capacitor.

2. The power converting device as claimed in claim 1, wherein:

said first switch unit is coupled to said third switch unit, and said second switch unit is coupled to said fourth switch unit;

said switches of said first and fourth switch units are simultaneously in the ON-state, and said switches of said second and third switches are simultaneously in the ON-state; and when said switch of said first switch unit is in the ON-state, said switch of said second switch unit is in the OFF-state.

3. The power converting device as claimed in claim 2, wherein:

when said switches of said first and fourth switch units are in the ON-state, said output capacitor is charged so that the AC voltage output is a positive half of a sinusoidal signal; and when said switches of said second and third switch units are in the ON-state, said output capacitor is reversely charged so that the AC voltage output is a negative half of the sinusoidal signal.

4. The power converting device as claimed in claim 1, wherein a duration of the ON-state of one of said first and second switches of said clamp unit does not overlap a duration of the ON-state of the other one of said first and second switches of said clamp unit.

5. The power converting device as claimed in claim 1, wherein said first and second ends of said first winding of said transformer are polarity and non-polarity ends, respectively, said first and second ends of said second winding of said transformer being polarity and non-polarity ends, respectively.

* * * * *